March 17, 1953  L. A. WILLIAMSON, JR., ET AL  2,631,796
AIRCRAFT JET ENGINE COOLING SYSTEM
Filed July 24, 1950
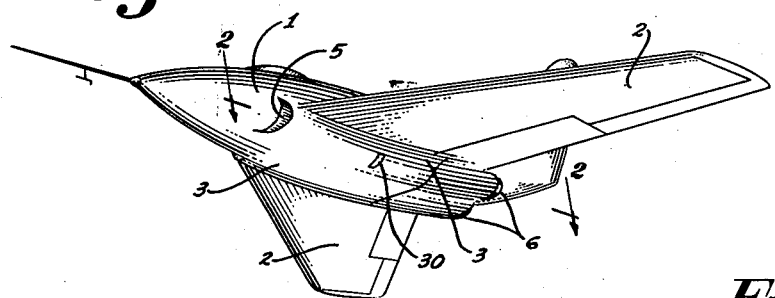
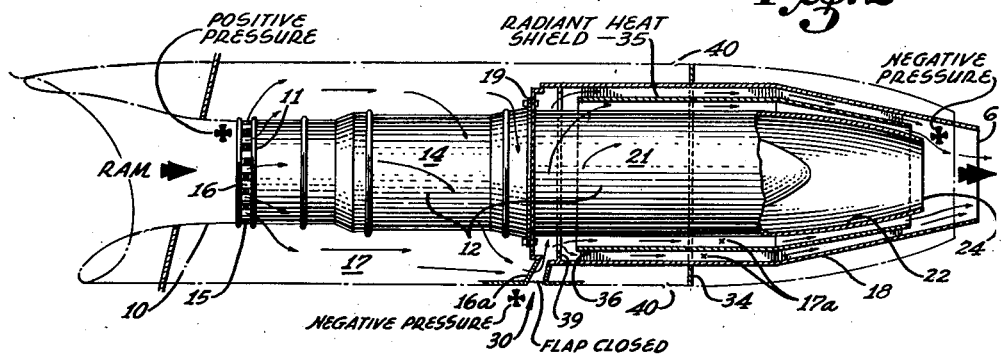
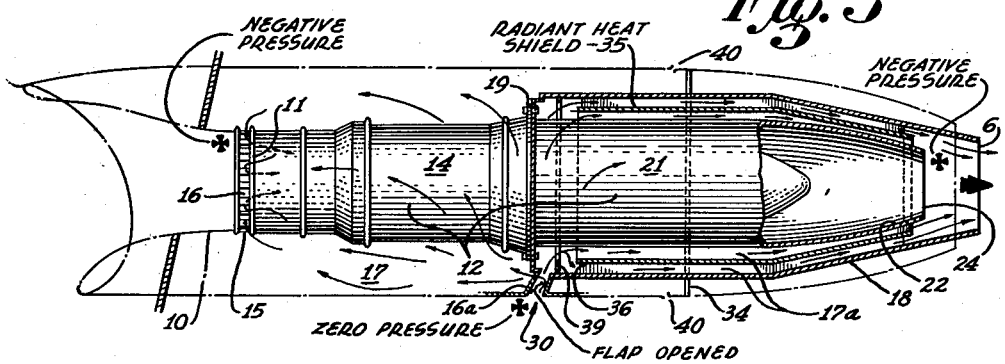
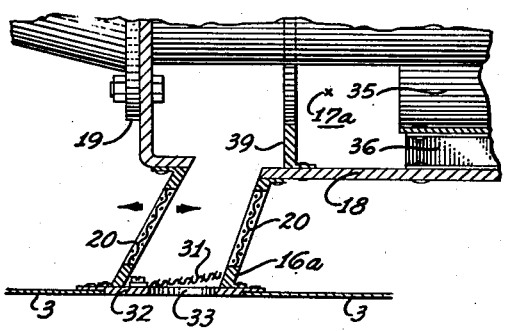
INVENTORS:
LOYAL A. WILLIAMSON, JR.
GEORGE H. SCHWAB, JR.
By Herbert E. Metcalf
THEIR PATENT ATTORNEY Patented Mar. 17, 1953

2,631,796

UNITED STATES PATENT OFFICE 2,631,796

AIRCRAFT JET ENGINE COOLING SYSTEM

Loyal A. Williamson, Jr., Los Angeles, and George H. Schwab, Jr., Hermosa Beach, Calif., assignors to Northrop Aircraft, Inc., Hawthorne, Calif., a corporation of California Application July 24, 1950, Serial No. 175,538

5 Claims. (Cl. 244—74)

1

The present invention relates to jet engine cooling systems, and, more particularly, to such a cooling system for use when the jet engine is installed in high speed aircraft.

It is customary, when jet engines are installed in aircraft, to terminate the jet tail pipe just short of an engine encircling shroud spaced from the engine casing; this arrangement causes a negative pressure to be created at the exhaust end of the installation. Air is customarily admitted between the shroud and the engine ahead of the combustion chambers, turbine and tail pipe of the engine through an airscoop. During flight, a ram pressure is developed in the airscoop which, combined with the negative pressure at the exhaust end of the engine, causes a satisfactory cooling flow of air to pass through the shroud. On the ground, however, and at low airplane speeds, ram pressure is absent or very small, and the cooling flow is substantially entirely dependent upon the negative pressure developed by the ejector action of the jet.

On very high speed airplanes, the drag of special engine cooling airscoops is undesirable, and it is advantageous to inlet the engine cooling air through the jet engine inlet and duct, thereby completely eliminating the special cooling airscoop. The action of such a cooling air inlet is satisfactory as long as positive ram pressure is obtained in the jet inlet, such as will exist when the aircraft is in flight, but is not satisfactory when the engine is running on the ground or at low aircraft speeds. This is because the suction developed by the compressor of the jet engine causes a negative pressure to be created in the jet engine inlet duct and at the inlet to this duct. When, then, one end of the space between shroud and engine is connected to the jet engine inlet, with the other end connected to the ejector structure at the exhaust end of the jet engine, negative pressures will exist at both places in the absence of ram, and very little, if any, cooling air flow will result.

It is an object of the present invention to provide a means and method of obtaining a satisfactory cooling air flow around a jet engine when the inlet for the cooling air flow is common with the inlet to the jet engine.

In brief, the present invention includes a shroud around the rear portions of a jet engine as installed in an aircraft. The aft end of the shroud is positioned so that a negative pressure is developed between engine and the shroud due to ejector action of the jet exhaust. The inlet to the shroud is in the main air inlet to the compressor of the jet engine in a position where the pressure is also negative when the airplane is stationary or operating at low speeds, such as when taxiing or during take-off. In order that a satisfactory cooling circulation be maintained under these conditions, an auxiliary air inlet is provided opening into the shroud between the two negative pressure areas, this latter inlet opening into the atmosphere at an area where there is zero pressure when the aircraft is stationary and negative pressure when the airplane is in flight. The auxiliary opening is provided with a flap valve opening inwardly. Under these circumstances, cooling air can enter the auxiliary air inlet freely to flow through the shroud from front to rear and ventilating air can flow from the auxiliary air inlet around the forward engine sections to the compressor inlet when the aircraft is stationary. The flap valve automatically closes as ram pressure develops in flight and the external pressure at the auxiliary inlet reduces, to establish a straight through, one-way cooling flow in the shroud from the main air inlet.

Other advantages and objects of the invention will be more fully understood by reference to the drawings in which:

Figure 1 is a perspective view of a jet propelled airplane embodying one preferred form of the present invention.

Figures 2 and 3 are schematized sections taken as indicated by the line 2—2 in Figure 1; Figure 2 showing cooling air flow conditions in flight; Figure 3 showing cooling air conditions with the aircraft stationary.

Figure 4 is an enlarged sectional diagram of a flap valve used in the cooling system shown in Figures 1 and 2.

Referring first to Figure 1, a high speed jet airplane, such as the United States Air Force X-4 airplane, capable of speeds approaching Mach No. 1.0 is provided with a fuselage 1, sweptback wings 2, and a pair of jet engines of the gaseous combustion turbine type disposed in fairings 3 on each side of fuselage 1.

Each jet engine is provided with a main air inlet opening 5 and an engine shroud opening 6 through which the jet gases exhaust to the atmosphere.

As it is not practical, in such an airplane, to provide an additional air inlet or scoop for cooling air to be used for cooling the jet engine, air for such cooling is taken from inside the main air inlet opening 5. Such a system is shown diagrammatically in Figures 2 and 3.

Here, a short inlet duct 10 connects the main air inlet opening 5 with the front end 11 of a jet engine 12, the air supply for the jet engine passing into a compressor section 14 of the engine 12 through the front end 11. However, front end 11 is spaced from the aft end of inlet duct 10 by spacers 15 to provide an annular cooling air inlet 16 through which air can pass into a space 17 between the airplane structure and engine 12. A shroud 18, cantilevered from a mounting flange 19 on the engine casing, extends rearwardly from the beginning of the combustion and turbine section 21 of the engine 12 and around tail pipe 22 of the engine to terminate at shroud opening 6 beyond the end of tail pipe 22, forming a cooling space 17a between the shroud 18 and engine. A shroud inlet duct 16a, having a fire screen 20 (Figure 4) in the front and rear sides thereof, provides an air entrance at the front of the shroud 18. As the jet of hot gases issuing from exhaust opening 24 of the tail pipe 22 passes through the shroud opening 6, a negative pressure will be developed by ejector action tending to draw air through spaces 17 and 17a, by way of the fire screen 20. However, as stated above, when the airplane is stationary with the engine running, a negative pressure will also be present in inlet duct 10 so that little or no cooling flow will result.

In order that atmospheric air can be admitted under these conditions, an auxiliary air inlet 30 is provided into the shroud inlet duct 16a, this auxiliary inlet 30 extending into shroud space 17a from the engine fairing 3 forming a portion of the external surface of the airplane. As best shown in Figure 4, auxiliary air inlet 30 is provided with a flap valve 31, opening inwardly, preferably of impregnated cloth sufficiently flexible to open freely while conforming to the curve of the air frame. Flap valve 31 is attached to an external flush plate 32 having openings 33. Inlets 16a and 30 are disposed annularly around the shroud periphery for a substantially greater distance than the longitudinal dimension of auxiliary inlet 30.

The pressure conditions in flight, of the system just described, are shown diagrammatically in Figure 2.

Under these flight conditions a positive ram pressure exists in the inlet duct 10 at the annular opening 16 into space 17, and a negative pressure will exist in the annular space between shroud 18 and jet pipe 22 at the end of the jet pipe 22. Consequently, an adequate cooling flow will exist through the entire shroud space 17a, coming through the fire screen 20. As the internal pressure in shroud inlet duct 16a will be positive, and as there will be a negative pressure just outside of the airplane skin at the auxiliary air inlet 30, the flap 31 will close the auxiliary air inlet 30. A firewall 34, blocking the space between the shroud 18 and the engine compartment, performs its usual function and also insures that substantially full air flow from the inlet duct 10 over the entire engine will take place throughout the spaces 17 and 17a.

The pressure conditions on the ground with engine operating are shown in Figure 3. In this case, the pressure in inlet duct 10, in the absence of ram, becomes negative, with the pressure at the tail pipe end of the shroud remaining negative. Under these conditions, the pressure in shroud space 17a is negative throughout. With zero pressure at the auxiliary inlet 30, the flap 31 will open and cooling air will enter through the auxiliary inlet 30 to flow forwardly to the air inlet duct 10, and rearwardly through shroud space 17a to the ejector end of the engine. Ample cooling flow is thus provided when the airplane is stationary. As this ample flow continues as the airplane increases speed to where the air inlet duct 10 pressure changes to positive due to ram effect, and as full front to rear flow starts at that speed, ample cooling of the engine is provided under all conditions. Since negative pressures normally exist over the entire midportion of a high speed airplane in flight, proper location of the auxiliary air inlet 30 is not only easy to determine, but is almost unavoidable.

In the X-4 airplane, shown in Figure 1, it was found that cooling, using the system described herein, was sufficiently good when the engine was operating with the airplane stationary or at low speeds, that the normal complicated heat insulating blanket over the combustion chambers, turbine and tail pipe could be dispensed with, only a single radiant heat shield 35, such as a polished stainless steel sheet, being required between shroud 18 and the engine casing, this shield 35 being spaced from both shroud and casing so that cooling air can flow on each side thereof. Shield 35 may, for example, be supported from shroud 18 by means of longitudinal support members 36 permitting air flow therealong.

A distributing baffle 39 inside of the shroud 18 just aft of the shroud inlet 16a is preferably provided to obtain a uniform air flow on all sides of the engine at the shroud inlet. In the particular embodiment illustrated, a few small ventilating openings 40 are also provided in the engine compartment just forward of the firewall 34, to ventilate the region aft of the shroud inlet 16a. These openings 40 are of no significance as far as engine cooling is concerned, and they are too small and few in number to destroy the pressure differential which causes opening of the flap valve 31. For other, more general, embodiments, the firewall 34 could be relocated at a more normal position between the compressor section 14 and the combustion section 21, and the ventilating openings 40 then eliminated.

Also, any satisfactory air inlet from the main inlet duct 10 to the compressor section space 17 could be substituted for the rather unusual slotted design shown herein, and a hinged metal door might be used for the flap valve 31 and plate 32, provided that the skin curvature would permit same. Other arrangements of this invention will readily suggest themselves to those skilled in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. In an airplane having a gas turbine engine including compressor, combustion, turbine, and tail pipe sections in that order, and a compressor air inlet duct; engine cooling means comprising a shroud spaced from and positioned around said combustion, turbine and tail pipe sections of said engine, said shroud extending aft beyond the end of said tail pipe section to form a negative pressure space between said shroud and said tail pipe when said engine is running, said shroud being sealed at its forward end to said engine except for a shroud opening, a cooling air inlet duct connected to said shroud opening, said cooling air inlet duct having a second opening flush with the outer surface of said airplane at an area where there is zero pressure when said airplane is stationary and negative pressure when said airplane is in flight, and a third opening in communication with said compressor air inlet duct, and means opening and closing said second opening in accordance with the resultant of the pressure in said compressor air inlet duct, the pressure in said negative pressure space and the pressure at said second opening of said cooling air inlet duct.

2. Apparatus in accordance with claim 1 wherein the last mentioned means is a freely swinging flap valve opening inwardly at said flush opening into said cooling air inlet duct and controlled as to position by the relative pressure on each side thereof.

3. In an airplane having a gas turbine engine including an air inlet opening and a jet exhaust opening, an air inlet duct connected to said engine air inlet opening and having ram pressure therein only when said airplane is in flight and a negative pressure therein when said engine is running in the absence of ram, a cooling shroud spaced from and surrounding at least a portion of the rear of said engine to form an engine cooling space, said shroud extending rearwardly beyond said jet exhaust opening to form a negative pressure space in said shroud adjacent said latter opening, having a negative pressure therein when said engine is running, means connecting said shroud with said engine air inlet duct, a cooling air inlet duct having an inward opening into said shroud and an outward opening on the exterior surface of said airplane at an area where there is zero pressure when said airplane is stationary and negative pressure when said airplane is in flight, and closure means for said outward opening operated by the resultant of the pressures of said engine air inlet duct, said negative pressure space and the pressure at the surface area of said airplane at the outer end of said cooling air inlet duct whereby air is drawn through said shroud from said area on the exterior surface of said airplane when said airplane is stationary with the engine running, and from said air inlet duct only after ram pressure has developed therein.

4. Apparatus in accordance with claim 3 wherein said cooling air inlet duct closure means is a freely swinging flap valve opening inwardly into said cooling air inlet duct at said outward opening of said cooling air inlet duct.

5. In an airplane driven by a gas turbine engine, a ram air duct connected with the forward end of said engine having a negative pressure therein when said engine is running in the absence of ram and a positive pressure therein due to ram when said airplane is in flight, an ejector duct at the aft end of said engine having a negative pressure therein when said engine is running, a cooling air shroud spaced from and surrounding at least a portion of said engine, said shroud being forwardly connected to said ram air duct and rearwardly to said ejector duct, and means admitting cooling air at substantially zero pressure to said shroud when both said forward and rear connections of said shroud are at a negative pressure.

LOYAL A. WILLIAMSON, Jr.
GEORGE H. SCHWAB, Jr.

REFERENCES CITED

The following references are of record in the file of this patent:

UNITED STATES PATENTS

| Number | Name | Date |
|---|---|---|
| 2,501,633 | Price | Mar. 21, 1950 |
| 2,508,288 | Owner | May 16, 1950 |

FOREIGN PATENTS

| Number | Country | Date |
|---|---|---|
| 579,657 | Great Britain | Aug. 12, 1946 |